(12) United States Patent
McCredie

(10) Patent No.: US 6,216,429 B1
(45) Date of Patent: Apr. 17, 2001

(54) HARVESTING PLATFORM WITH AN IN-LINE CUTTERBAR DRIVE

(75) Inventor: Paul John McCredie, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/280,884

(22) Filed: Mar. 29, 1999

(51) Int. Cl.7 ................................................ A01D 34/32
(52) U.S. Cl. .................................... 56/287; 56/296
(58) Field of Search .......................... 56/296, 303, 304, 56/309, 311, 279, 280, 282, 284, 287, 364; 248/674, 200; 74/60

(56) References Cited

U.S. PATENT DOCUMENTS

| | | | | |
|---|---|---|---|---|
| 2,630,670 | * | 3/1953 | Sherman | 56/296 |
| 3,104,511 | * | 9/1963 | Clark | 56/296 |
| 3,648,444 | * | 3/1972 | Dunn | 56/296 |
| 4,023,333 | * | 5/1977 | Anderson | 56/296 |
| 4,103,556 | * | 8/1978 | Niday | 56/296 |
| 4,402,174 | * | 9/1983 | Boone | 56/296 |
| 4,813,291 | | 3/1989 | Schumacher, II et al. | 74/52 |

* cited by examiner

Primary Examiner—Thomas B. Will
Assistant Examiner—Meredith C. Petravick

(57) ABSTRACT

A harvesting platform having a frame and a cutterbar supported by the frame, a reciprocal knife that moves relative to the cutterbar, a drive motor having a rotary input and a linearly reciprocating output shaft. The output shaft is coupled to the knife for reciprocating the knife and a one piece mounting bracket is coupled to the cutterbar and the drive motor to establish the position of the drive motor relative to the cutterbar. The bracket has machined surfaces engaging the drive motor and the cutterbar to establish the relative positions of the drive motor and the cutterbar within the machining tolerances. This provides proper alignment of the drive motor output with the cutterbar that is necessary for an in-line drive motor.

16 Claims, 4 Drawing Sheets

HARVESTING PLATFORM WITH AN IN-LINE CUTTERBAR DRIVE

BACKGROUND OF THE INVENTION

This invention concerns a harvesting or gathering platform having an in-line knife drive and especially to a mounting bracket for the drive motor which assures proper alignment of the drive motor with the knife.

Harvesting platform knives have typically been driven by a gearbox having a rotating output shaft. The gearbox, or drive motor, output shaft is coupled to the knife by a drive arm. The output shaft rotates back and forth to produce an arcuate reciprocating motion to the end of the drive arm. As a result, the knife does not move in a purely linear motion. The knife end moves in the arcuate path of the drive arm, resulting in the knife end moving in an arcuate path as the knife reciprocates. The arcuate movement of the knife end causes a sine wave deflection of the knife to travel along the length of the knife. This deflection is more pronounced in a double cut knife where the knife stroke is longer, thus requiring greater rotation of the drive arm. One solution is to lengthen the drive arm. This reduces the angular extent of rotation of the motor output shaft needed for the longer stroke. A longer drive arm, however, presents other difficulties.

Another solution to the arcuate motion in the knife is to provide a knife drive that is linear. Such a linear drive is available from the Schumacher Company of Germany and is described in U.S. Pat. No. 4,813,291. This drive has a rotary input device, such as a pulley or gear, and an output shaft that reciprocates in a linear motion, normal to the axis of the output shaft. Such a drive is referred to as an "in-line" drive. With an in-line drive, it is necessary to properly position the drive motor output shaft so that the direction of motion of the output shaft is in-line with desired knife motion.

SUMMARY OF THE INVENTION

It is thus an object of the present invention to provide for precise relative positioning of the drive motor with the cutterbar knife.

It is a feature of the invention to provide a mounting bracket for the drive motor that establishes the relative positions of the knife and the drive motor to assure proper alignment therebetween.

The present invention pertains to a harvesting platform having a frame, a cutterbar, a knife, a drive motor having a rotary input and a linearly reciprocating output shaft coupled to the knife and particularly to a one piece mounting bracket coupled to the cutterbar and the drive motor to establish the position of the drive motor relative to the cutterbar. The mounting bracket is a single piece casting having a cutterbar mounting face with a machined engaging portion and a drive motor mounting face with a machined engaging portion. The machined engaging portions enable the relative positioning of the cutterbar and drive motor to be established within the close tolerances of the machining operations.

The drive motor mounting face includes raised protrusions that engage the sides of the drive motor legs to prevent rotation of the drive motor about an axis perpendicular to the drive motor mounting face. The drive motor mounting face is formed by a flange extending upward from a base portion of the bracket. The flange is reinforced by a web to prevent twisting of the flange and misalignment of the drive motor. The cutterbar mounting face is formed by a boss raised from the base portion of the bracket and having a machined upper surface forming the machined engaging portion of the bracket. Threaded apertures in the boss receive fasteners for attaching the cutterbar to the bracket. The bracket has further apertures and through bores to attach the bracket to a platform frame.

DESCRIPTION OF THE PREFERRED EMBODIMENT

Figure 1:
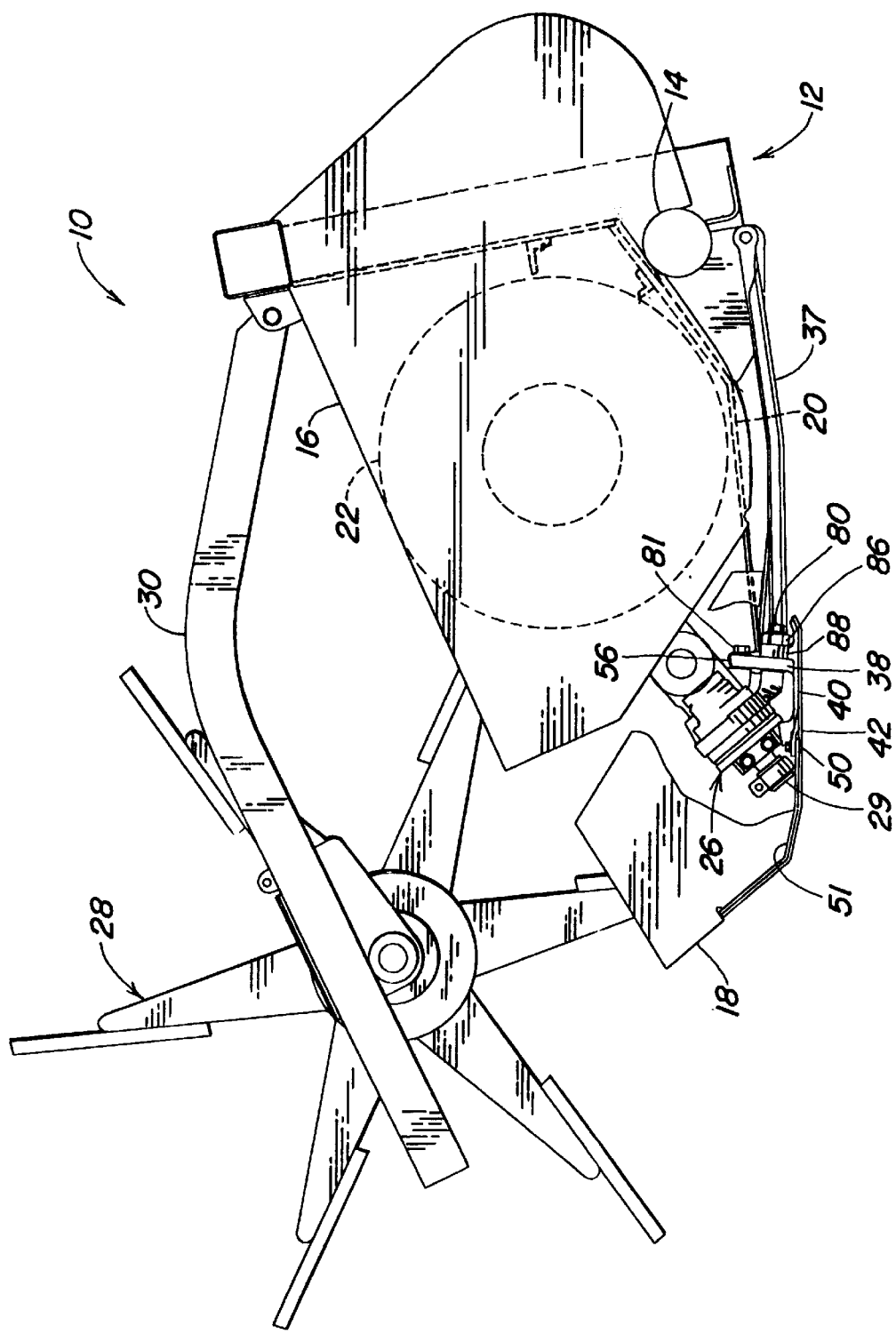
FIG. 1 is a side elevation view of a harvesting platform with portions broken away to illustrate the drive motor and mounting bracket.

The invention is embodied in a harvesting platform shown in FIG. 1 and designated generally at 10. The illustrated platform 10 is of the type for use with a combine but the invention is not limited to harvesting platforms for combines. Any type of platform having a cutterbar may utilize the in-line drive motor mounting bracket of the present invention.

The platform 10 includes, in part, a frame 12 including a tubular lateral main frame member 14 spanning the width of the platform. A sidewall 16 and crop divider 18 are provided at each lateral end of the platform 10, in a typical manner. Only the left-hand sidewall and crop divider are shown. A floor 20 extends between the opposite sidewalls 16. A transverse crop converging auger 22 is mounted immediately above the floor.

A harvesting reel, indicated generally by the numeral 28, spans the width of the platform 10 forwardly of the auger 22. A pair of generally fore and aft reel support arms 30 mounts the reel 28 on the platform 10. The reel support arms are pivotally connected to the platform frame 12 at their rear ends in a conventional manner. The reel support arms 30 are generally above the left and right sidewalls 16. Cylinders for controlling the position of the reel support arms have been deleted for purposes of clarity.

A transverse cutterbar 24 (FIG. 2) is mounted along the leading edge of the floor 20. The cutterbar 24 is coupled to the forward end of a plurality of laterally spaced pivot arms, not shown, rotatably coupled to the platform frame 12 in a known manner to form a floating cutterbar. The cutterbar 24 is of a conventional construction having a plurality of knife guards which have been deleted from the illustrations for purposes of clarity. A knife 104 runs in the cutterbar knife guards.

A stabilizer 37, at the left-hand side of the platform, is pivotally mounted to the main frame member 14. The stabilizer 37 supports a drive motor 26 at the left end of the cutterbar 24 that is used to reciprocate the knife. The stabilizer 37 pivots to enable the drive motor to float with the cutterbar 24. In a rigid platform, the stabilizer, or its equivalent frame structure, is fixed to the platform frame 12. The stabilizer 37, whether pivoting or not, will be considered and referred to herein as being part of the platform frame 12.

Figure 4:
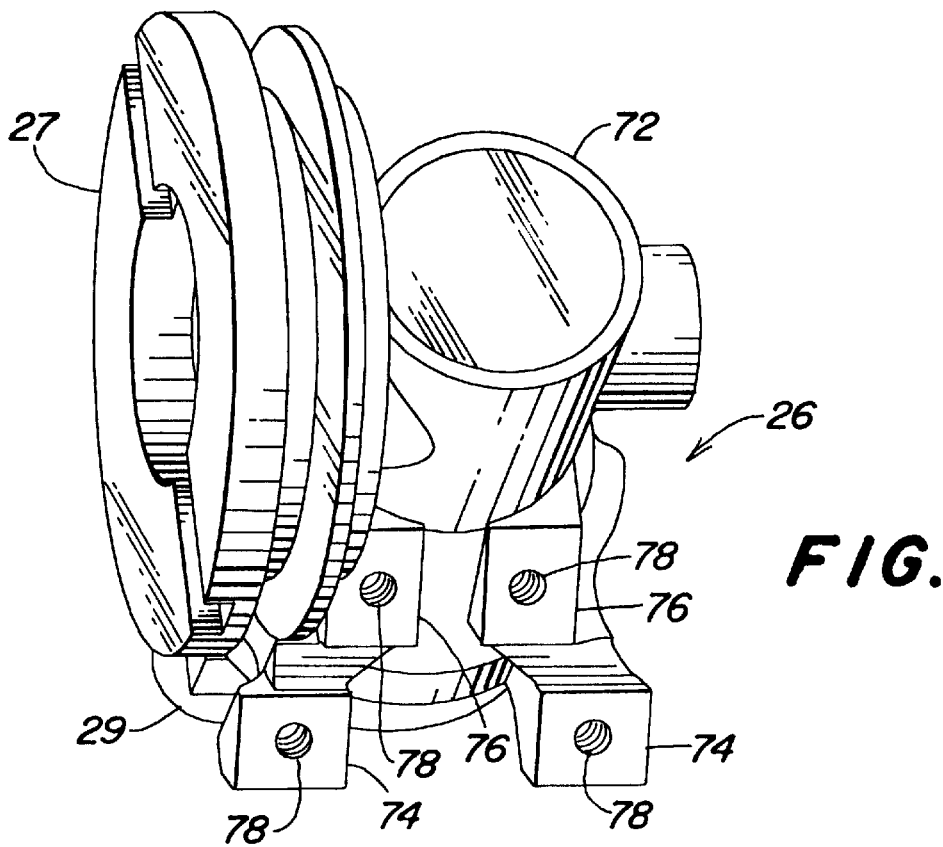
FIG. 4 is a rear perspective view of the drive motor.

The drive motor 26 is an in-line drive motor having a rotary input device 27 (FIGS. 4 and 6), such as a pulley or a sprocket, and an output shaft 29 that reciprocates linearly to impart a linear motion to the knife 104. As such, it is necessary that the linear motion of the output shaft be aligned with the knife. A mounting bracket 38, fixed to the stabilizer 37, is used to mount the drive motor and the cutterbar 24. The bracket 38 thus establishes the position of the drive motor relative to the cutterbar. The bracket 38 is also configured to hold the drive motor in the proper orientation.

The mounting bracket 38 has a lower, plate like, base portion 40. A plastic skid shoe 42 covers the bottom of the base portion 40. Two attachment portions are provided along a front edge 44 of the base portion 40. A front outboard attachment portion 46 has a pair of apertures 48. Fasteners 50 extend through the apertures 48 to attach a divider plate 51 to the bracket 38. The skid shoe 42 extends beneath both the divider plate 51 and the bracket 38. Apertures 53 in the base portion 40 are used to attach the skid shoe to the bracket.

A front inboard attachment portion 52 is formed by a raised boss 57 projecting upward from the base portion 40. The boss 57 has a machined upper surface 59 forming a cutterbar mounting face with a machined engaging portion 61. The boss 57 has three apertures 54 which are used to attach cutterbar 24 to the bracket 38.

The apertures 48 and 54 in the outboard and the inboard attachment portions 46, 52 are generally vertical in their orientation. Apertures 48 are through holes to receive nut and bolt fasteners 50. Apertures 54 are threaded bores to receive bolts 55 therein.

The bracket 38 further includes a generally upright flange 56 spaced rearward from the front edge 44 of the base 40. The flange 56 extends upwardly from the base portion 40 and has a front surface that forms a drive motor mounting face 58. The drive motor mounting face 58 has a machined engaging portion with spaced regions 60 surrounding lower apertures 62 and upper apertures 64. The rear surface of the upright flange 56 has machined regions 68 surrounding each of the lower and upper apertures 62, 64.

Figure 2:
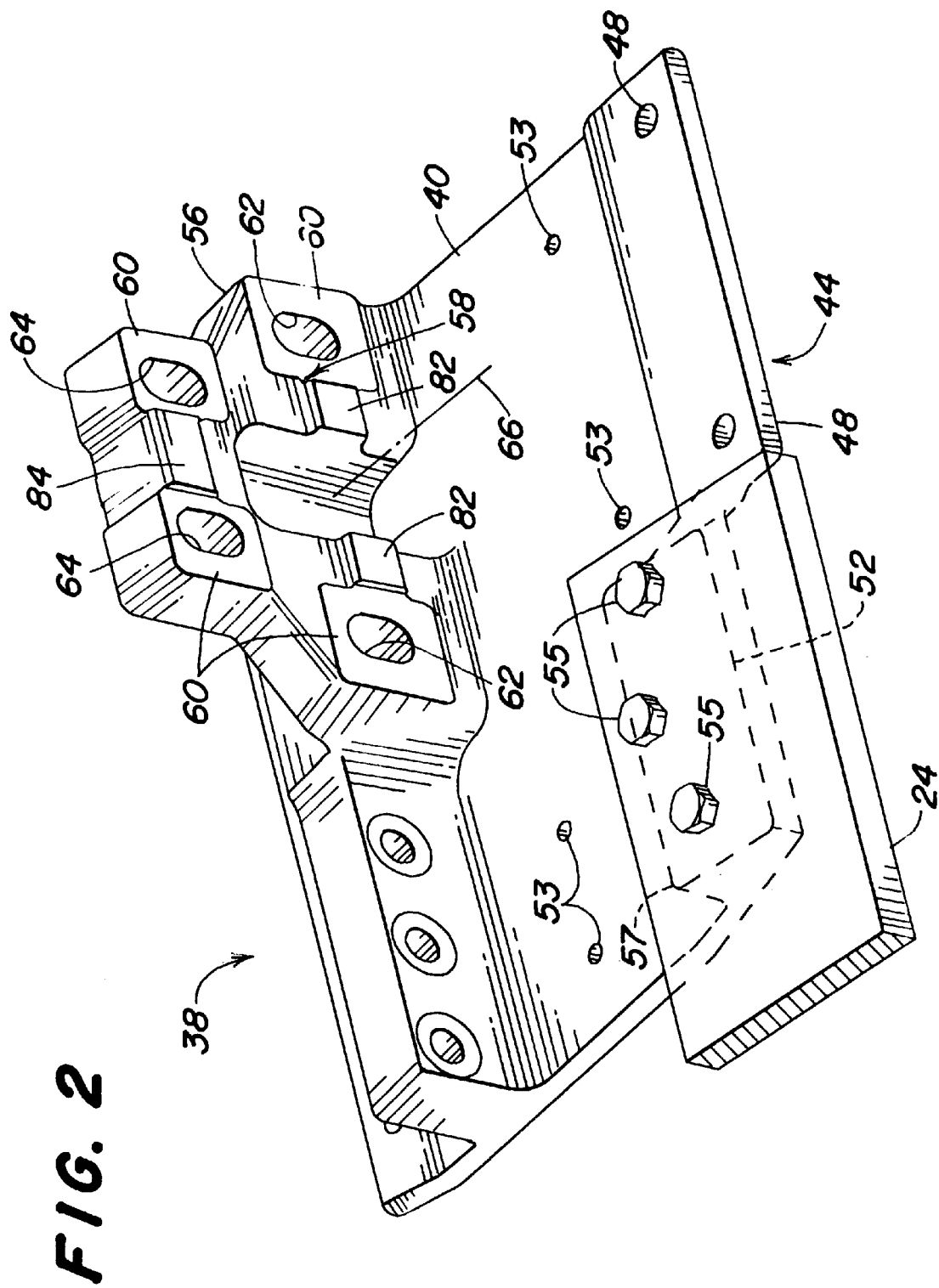
FIG. 2 is a front perspective view of the drive motor mounting bracket attached to the cutterbar.
Figure 3:
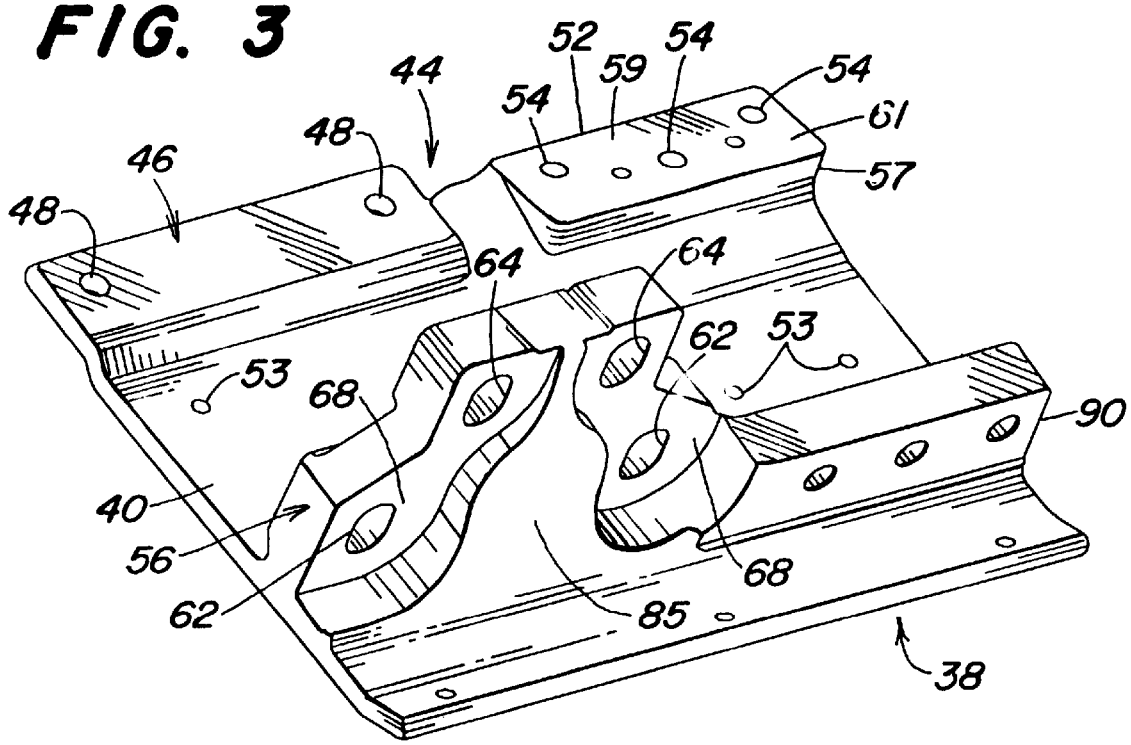
FIG. 3 is a rear perspective view of the drive motor mounting bracket.

The drive motor 26 includes a housing 72 with lower legs 74 and upper legs 76. The legs 74, 76 have threaded bores 78 for mounting the drive motor 26 to the bracket 38. The legs 74, 76 engage the machined spaced regions 60 of the bracket 38. Lower and upper bolts 80, 81 extend forward through the lower and upper apertures 62, 64, respectively, and are threaded into the drive motor housing 72 to mount the drive motor 26 to the bracket 38. The apertures 62, 64 in the bracket are vertically elongated, forming slots as shown in FIG. 2, to enable the vertical position of the drive motor to be adjusted.

Protrusions 82 are adjacent the machined spaced regions 60 surrounding the lower apertures 62. The protrusions 82 extend forward, slightly beyond the machined surfaces. A third protrusion 84 extends forward between the two spaced machined regions 60 surrounding the upper apertures 64. The protrusions 82 and 84 are disposed between the drive motor legs 74, 76 respectively and engage the sides of the legs to prevent rotation of the drive motor about an axis 66 perpendicular to the drive motor mounting face 58. The protrusions assure that the drive motor maintains the proper orientation to keep the motion of the drive motor output shaft generally horizontal.

A web 85 that projects rearward from the upright flange 56 strengthens the flange 56. The web helps to prevent twisting of the flange. Twisting of the flange will cause the motion of the output shaft 29 to be slightly fore and aft rather than transverse.

The upper bolts 81 extend only through the flange 56 and into the drive motor housing 72. The lower bolts 80, however, also attach the stabilizer 37 to the bracket 38. Each lower bolt 80 extends forward, through an end flange 86 of the stabilizer 37, through a spacer 88, through the bracket 38 and into a threaded bore 78 in the drive motor housing. The attachment of the stabilizer 37 to the flange 56 further strengthens the flange 56. The spacers 88 on the two lower bolts 80 are used to provide clearance beyond the web 85 and present a flat surface for the stabilizer 37 to engage on the rear of the flange 56. If the rear surface of the flange 56 were provided with a flat face for engagement with the stabilizer 37, there would be no need for the spacers 88.

A second flange 90 extends upward from the base portion 40, inboard of the flange 56. The second flange 90 is also used to couple stabilizer 37 to the mounting bracket 38 by nut and bolt fasteners (not shown).

By virtue of the attachment of the cutterbar 24 to the bracket 38, the position of the cutterbar relative to the drive motor is established. By machining the surfaces of the bracket 38 engaged by the drive motor housing 72 and the cutterbar 24, the drive motor position relative to the cutterbar is held to the tolerances of the machined surfaces.

Figure 5:
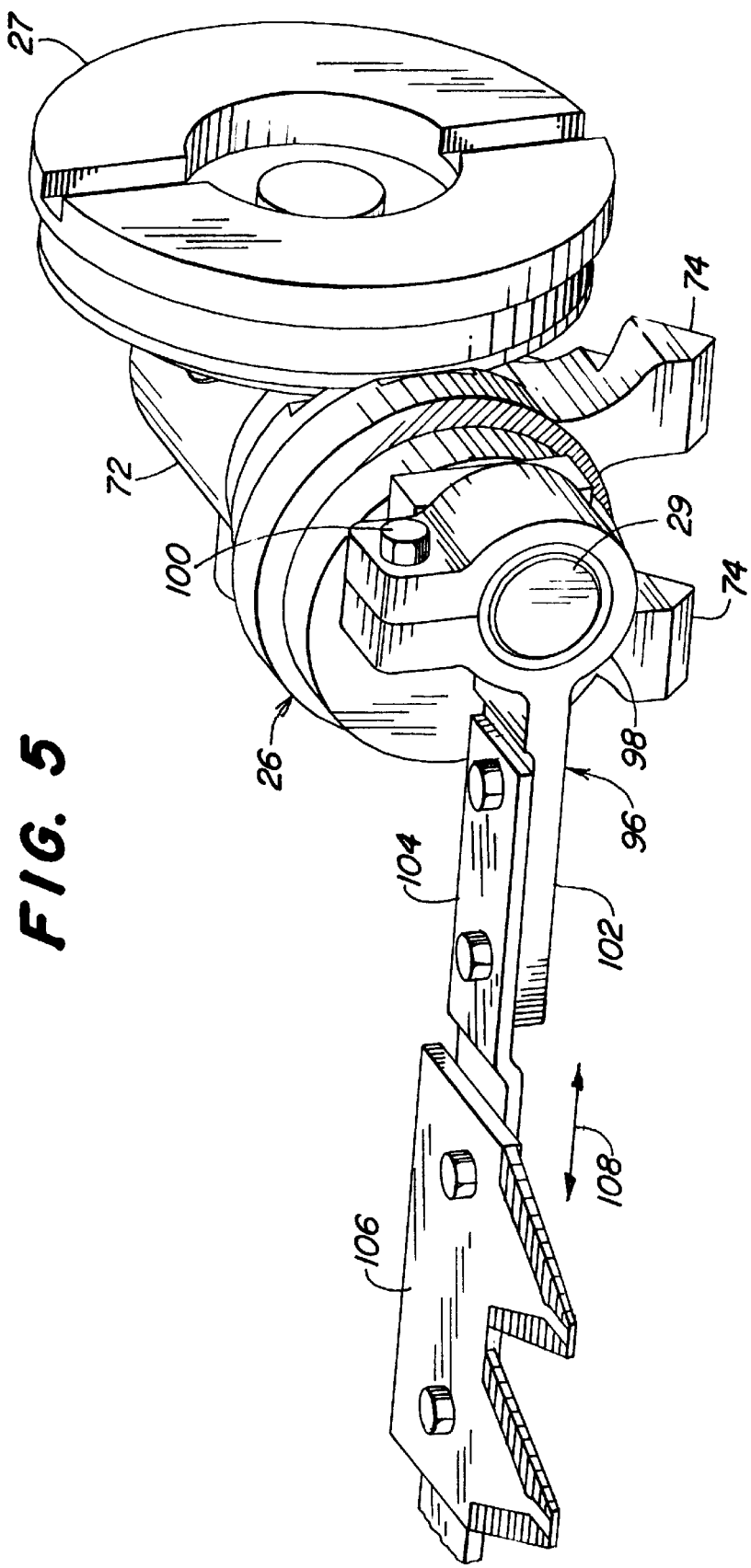
FIG. 5 is a front perspective view of the drive motor attached to the knife.

The attachment of the drive motor output shaft 29 to the knife is shown in FIG. 5. A knife head 96 has a collar 98 that fits over the output shaft 29 and is retained by a fastener 100. A lateral extension 102 is bolted to the knife 104. Knife sections 106 are carried by the knife 104 for reciprocating motion in the direction of the arrow 108. Further adjustment between the drive motor output shaft 29 and the cutterbar is made in the positioning of the knifehead 96 along the length of the output shaft 29 of the drive motor 26. The adjustment capability enables the precise alignment of the drive motor output shaft with the knife.

The use of a single piece casting for the bracket attaching the cutterbar to the drive motor facilitates positioning of the drive motor output shaft in-line with the knife. By machining the engagement surfaces of the bracket, the relative positions of the engagement surfaces can be maintained within the narrow tolerances of the machining operation. The bracket could be made as a weldment, however the positioning of the drive motor would likely not be as accurate. The bracket 38 can be integrally cast with the stabilizer 37 as a single piece. The combined stabilizer and bracket would have machined engaging portions like those shown and described above for engagement by the cutterbar and the drive motor.

A similar bracket can be used with a rigid, non-floating cutterbar. The bracket may be configured differently due to differences in the cutterbar and the stabilizer, or frame, to which the bracket is mounted. However, the bracket would still have machined engaging portions for both the cutterbar and the drive motor to establish the relative positions of both. Brackets configured differently than that shown and described above can be utilized to carry out the present invention. As such, the invention should not be limited to the above-described embodiment, but should be limited solely to the claims that follow.

What is claimed is:

1. A harvesting platform comprising:
   a frame;
   a cutterbar supported by the frame;
   a reciprocating knife movable relative to the cutterbar;
   a drive motor having a housing, a rotary input device carried by the housing and a linearly reciprocating output shaft carried by the housing, the output shaft being coupled to the knife for reciprocating the knife; and a one piece mounting bracket carried by the frame, the mounting bracket having a cutterbar mounting face with a machined engaging portion engaging the cutterbar and attached to the cutterbar, the mounting bracket further having a drive motor mounting face with a machined engaging portion engaging the drive motor housing and to which the drive motor housing is attached to establish the position of the drive motor housing and output shaft relative to the cutterbar.

2. The harvesting platform as defined by claim 1 wherein the engaging portion of the drive motor mounting face has spaced regions and the drive motor housing has a plurality of spaced mounting legs which engage the spaced regions of the drive motor mounting face.

3. The harvesting platform as defined by claim 2 wherein the drive motor mounting face includes raised protrusions adjacent the spaced regions of the machined portion, the raised protrusions engaging sides of the drive motor mounting legs to prevent rotation of the drive motor about an axis perpendicular to the drive motor mounting face.

4. The harvesting platform as defined by claim 1 wherein the mounting bracket includes raised protrusions engaging sides of the drive motor housing to prevent rotation of the drive motor housing about an axis perpendicular to the drive motor mounting face.

5. The harvesting platform as defined by claim 1 wherein the mounting bracket includes a lower generally horizontal base portion with the cutterbar mounting face formed therein and a generally upright flange having a front surface which forms the drive motor mounting face of the mounting bracket.

6. The harvesting platform as defined by claim 5 wherein the mounting bracket further includes a web projecting rearward from the upright flange to strengthen the upright flange.

7. The harvesting platform as defined by claim 5 wherein the mounting bracket further includes a boss projecting upward from the base portion having a machined upper surface forming [a] the cutterbar mounting face.

8. The harvesting platform as defined by claim 5 wherein the upright flange has a plurality of bores and further comprising fasteners extending through the bores and into the drive motor housing to attach the drive motor housing to the mounting bracket.

9. The harvesting platform as defined by claim 1 wherein at least one of the fasteners attaching the drive motor housing to the mounting bracket also attaches the mounting bracket to the platform frame.

10. The harvesting platform as defined by claim 1 wherein the frame includes a main frame and a drive motor stabilizer pivotally mounted to the main frame and to the mounting bracket to enable the mounting bracket and drive motor to float relative to the main frame.

11. A mounting bracket for attaching a cutterbar drive motor to a harvesting platform comprising a one piece metal casting having a cutterbar mounting face with a machined engaging portion for engagement with a cutterbar to attach the cutterbar to the mounting bracket and a drive motor mounting face with a machined engaging portion for engagement with a drive motor housing to attach the drive motor housing to the mounting bracket, the drive motor mounting face having spaced regions for engagement with spaced mounting legs of the drive motor housing.

12. The mounting bracket as defined by claim 11 wherein the drive motor mounting face includes raised protrusions adjacent the spaced regions of the machined portion for engagement with sides of the drive motor mounting legs to prevent rotation of the drive motor housing about an axis perpendicular to the drive motor mounting face.

13. The mounting bracket as defined by claim 11 further comprising a base portion and a generally upright flange having a front surface which forms the drive motor mounting face.

14. The mounting bracket as defined by claim 13 further comprising a web projecting rearward from the upright flange to strengthen the upright flange.

15. The mounting bracket as defined by claim 13 wherein the mounting bracket further includes a boss projecting upward from the base portion having a machined upper surface forming the cutterbar mounting face machined engaging portion and threaded apertures in the boss for receiving fasteners to attach the cutterbar thereto.

16. The mounting bracket as defined by claim 13 wherein the upright flange has a plurality of through bores for fasteners to attach the drive motor to the mounting bracket and the mounting bracket bracket to a harvesting platform frame.

* * * * *